(12) United States Patent
Kashioka

(10) Patent No.: US 8,278,542 B2
(45) Date of Patent: Oct. 2, 2012

(54) METRONOME RESPONDING TO MOVING TEMPO

(76) Inventor: Seiji Kashioka, Walnut, CA (US)

( * ) Notice: Subject to any disclaimer, the term of this patent is extended or adjusted under 35 U.S.C. 154(b) by 0 days.

(21) Appl. No.: 10/593,889

(22) PCT Filed: Mar. 18, 2005

(86) PCT No.: PCT/IB2005/000715
§ 371 (c)(1),
(2), (4) Date: Sep. 23, 2006

(87) PCT Pub. No.: WO2005/093529
PCT Pub. Date: Oct. 6, 2005

(65) Prior Publication Data
US 2007/0199431 A1    Aug. 30, 2007

(30) Foreign Application Priority Data
Mar. 24, 2004  (JP) .................................. 2004-87405

(51) Int. Cl.
*G09B 15/00*  (2006.01)
(52) U.S. Cl. ......................................................... 84/484
(58) Field of Classification Search .................. 84/484, 84/611, 612, 635, 636, 652, 668, 651, 667, 84/713, 714
See application file for complete search history.

(56) References Cited

U.S. PATENT DOCUMENTS

| | | | | |
|---|---|---|---|---|
| 4,321,853 A | * | 3/1982 | Tumblin | 84/454 |
| 4,649,794 A | * | 3/1987 | George | 84/484 |
| 4,694,724 A | * | 9/1987 | Kikumoto et al. | 84/612 |
| 4,733,593 A | * | 3/1988 | Rothbart | 84/484 |
| 5,256,832 A | * | 10/1993 | Miyake | 84/636 |
| 6,016,295 A | * | 1/2000 | Endoh et al. | 369/47.16 |
| 6,518,492 B2 | * | 2/2003 | Herberger et al. | 84/636 |

FOREIGN PATENT DOCUMENTS

JP         55087982 A  *  7/1980

* cited by examiner

*Primary Examiner* — Elvin G Enad
*Assistant Examiner* — Andrew R Millikin

(57) ABSTRACT

A metronome ticking the beat for performance especially with moving tempo, and having display looks like conductor's baton so that watcher can precisely predict beat timing to catch up the moving tempo. It has tapping button to record all the beat duration time data on memory. With the data on memory all the beats can be reproduced. Partial modification of beat duration time is also possible by tapping. Dedicated device uses vertically placed light emitting element array. Emitting point moves like ball thrown upward. Bound timing is beat timing. The metronome opens new way to produce music minus one or karaoke media.

2 Claims, 3 Drawing Sheets

METRONOME RESPONDING TO MOVING TEMPO

CROSS REFERENCE TO RELATED APPLICATIONS

This application is based on International Application No. PCT/IB2005/000715, filed Mar. 18, 2005, which is further based on Application for Japanese Patent No. 2004-87405, filed Mar. 24, 2004.

BACKGROUND OF THE INVENTION

This invention is related to metronome, which ticks beats, whose tempo moves along music, and has display, with which user can predict beat timing more precisely than conventional one.

Conventional metronomes tick the beat precisely and evenly in tempo, which is set preliminarily and kept until next operation. There was no metronome with moving tempo.

Method of setting tempo by tapping two beats was disclosed. Japanese patent application publication JP H7-271360 describes tempo setting from interval time between two beats on electronic percussion instrument hit by user. With this user can specify a tempo freely and directly. But this tempo specifies only fixed tempo after that, it does not specify moving tempo.

Another Japanese patent application publication JP H7-271360 for automatic playing instrument shows method of display or making sound according to the data of tempo and meter, which are attached preliminarily to music notes information. This tempo is set for each music work, but moving tempo is not specified.

Historically the first means to indicate the beat timing was mechanical pendulum with reciprocating motion sounding at each ends. Recently various electronic metronomes are developed and used. As visual presentation, for example in Japanese patent application publication JP H8-201541 image display device is used, and in Japanese patent application publication JP 2000-88977 array of light emitting elements is sequentially emitted. These electronic metronomes are aimed to imitate conventional mechanical metronomes, moving direction is transversal and reaching both ends shows beat timing. Some of them display movement along circular arc. Velocity of movement is flat or as shown in above patent application JP 2000-88977 velocity near end is slow downed. All these aimed to imitate mechanical metronome faithfully.

BRIEF SUMMARY OF THE INVENTION

In fine performance of music, tempo often changes and is moving locally. Conventional metronomes do not work for practice of this type of music. The first objective of this invention is to provide the metronome, which is able to follow moving tempo. This "moving" includes not only gradual change of tempo such as ritardando and accelerando, but also subtle swinging tempo at little beats not written on the music score.

To accomplish the first objective, composition means for beats timing data corresponding to moving tempo in macro and micro scope is crucial. It is required to modify easily the data partially. The second objective of this invention is to provide the means for composing and modifying the beat timing data.

Some display method is required for musician to play with uneven ticks of beats presented by the metronome of this invention, with which viewer can precisely predict the beat timing. In the book "Text book of conducting" from Ongakunotomo Publisher, Hideo Saito teaches about movement of point of attention such as top of baton. It says that reach point must be clear and the point should approach the reach point with accelerating speed and returning with decelerating speed. This means movement like bounding ball is good. The third objective of this invention is to provide display of beat, which gives precise prediction and confirmation without sound and further notice of which beat in the meter. In other word it is to provide virtual conductor with a device.

The forth objective of this invention is to provide means for easy use of this machine. Because this machine has new function, quite new, and effective operation should be created.

The fifth objective of this invention related to media recorded performance without solo player called music minus one. Recorded media of concerto without solo part as music minus one are published. Karaoke is same one, which is recorded performance without solo voice, even they call differently. But, without soloist part, it had tendency that tempo fell into constant. Performance of soloist with subtle tempo movement did not match with those recorded performance without solo. Also, timing of orchestra after long soloist-only passage was discrepant with soloist playing. It was common that metronome sound ticked beats during long soloist passage to resolve this discrepancy. This had problem of rigidly flat tempo and extraneous sound. The fifth objective of this invention is to provide means to resolve these problems and to grade up artistic level of final performance as well as to make it easy to play with music minus one by utilizing the metronome of this invention.

The system means hereunder the control system of this invention having at least a processor, program memory, and internal memory.

In accordance to this invention, to accomplish the first objective, all beat duration data and meter data for music work or its portion are stored in a memory. These data are sequentially read out from said memory, and are set as duration length to the next beat. Every time the time length is passed, beat is ticked and is advanced. Compressed form for the duration data may used as far as the same data is reproduced. For data storage, internal memory as well as detachable memory media such as memory stick or memory card used in the digital camera are used. Also, it can be downloaded into internal memory through network.

Simple one-dimensional array of beat duration data may be used as a basic form. But expression like digital music notation is preferable, for showing first beat and other beats differently or for synchronizing with trace of music notation. In other words, when the system ticks a beat, the system should update the current position data of measure number and beat number in the measure. In case beats are subdivided, expression on beat number may have fractional part; for example as two and two third. Also, expression of MBT (measure/beat/tick) may be used, which is used in computer music and electronic instruments.

In accordance to this invention, to accomplish the second objective, using tapping of user as input for beat duration data is easy for everybody and adopted as basic means in this invention. A button is furnished in dedicated device. Mouse for computer can be used. Also, foot pedal or some dedicated device may be used for input during playing music. There are two kind of input, initial input and modifying input. In initial input, beat duration data is written on cleared memory, but in modifying input, data is over written on the playing back data.

To input beat duration all through the music work is tiring task. So, alternative means of input is using personal computer for initial input with tempo words or numeric notation and then modify interactively. With this computer program, input for part with constant tempo can be done in block, and data for long period ritardando or accelerando can be computed automatically with smooth variance. If necessary, further modification is possible with numeric notation. Also, is possible to let computer play the specified portion and modify data with tapping input.

In accordance to this invention, to accomplish the third objective, one solution is utilizing a linear array of light emitting devices set in vertical direction, to make sequential drive of emitting devices so that emitting point moves back and forth with changing velocity and amplitude corresponding to beat in the meter. More specifically, amplitude before strong beat, in other words stressed beat, is set big, and amplitude before week beat, in other words unstressed beat, is set small. Further 4th beat of ⅝ meter is set intermediate amplitude. Basic moving pattern is designed to be parabola if expressed by a graph of vertical position versus time. Then, the moving point gathers speed, and turns over at the maximum speed, and looses speed as taught in the above textbook of conducting. In this way, accuracy of prediction of the beat timing is advanced. Of cause, various electronic display devices other than light emitting element array can be utilized.

Another solution for the third objective is to display movement of a point corresponding to the head of baton of conductor on the two-dimensional display device. In this solution, movements of the point are in different moving patterns by the meter.

In both solutions, beat position, that is, point at beat timing should be clearly shown. In case of light emitting element array, continuously emitting element is placed at the height of bottom of the array. In case of two-dimensional display, such as a line at the height of beat points is placed. Also, intensifying brightness of the moving point at the beat point works well for ascertain the timing. This is helpful, because sight line goes to music score during practice and metronome is often just in peripheral portion of field of view.

In accordance to this invention, to accomplish the forth objective, that is to provide means of user operation using metaphor of tape recorder, system has program supporting these operations. Initial input of this system corresponds to recording of tape recorder, and playback corresponds to playback. But, playback of this system has three mode, that are, read only mode which protect recorded data, over write mode which allows system partially overwrite when correcting input occurs, copy mode with which system produces copy data partially replaced by data from correcting input. Protection of original data is also possible by manual setting on data media, or using read only media. In any case, handling object is a group of data, which is called a file in computer systems. Input operations furnished are; selection of playback data file, writing data file (includes nothing), start of initial input, start of playback, pause, stop and return to starting point, fast forward and so on. Also, sound on/off, and volume of the sound.

Further for the forth objective, system must have means of specifying starting point of playback. This is necessary when user exercises on only some portion of the whole music stored. For this, stored data of each bar is attached with corresponding bar number, and operation design includes input of bar and beat number of starting and ending points. Also, current bar number and beat number are displayed during playback.

System further must have swing before start of playback. Skillful player can get first beat timing and tempo from swing of conductor's baton only one beat before the starting point. In this case we do not call the swing as dummy swing. System of this invention makes this one beat swing before the starting as default, so that user can adjust the timing of the first beat. But, for beginner it is required to have dummy swing of one bar or at least two to four beats so that user get enough tempo and timing. System of this invention has option to specify number of dummy swing, and this stay in the system as user preference.

The fifth objective is relating to music minus one or karaoke. This is effective and suitable application of the metronome of the invention. With this invention, following steps are taken for recording and playing. At first, make recording of performance with model player joining, and at the same time or later, using the metronome of this invention, input the every beats of whole music, which are exact copy of beats of the performance. Then make recording of performance without the model player along with the playback of the said recorded beats using the metronome of the invention without sounding. If necessary, adjust or correct the recording of beats in the metronome to fit the last recording. The last recording of music minus one and stored beats data are combined and are provided to end-users. End-user sets the provided data into the metronome of this invention, and starts both of the metronome and a playback device of provided media of sound recording with making synchronization of two. Assuming the same user performs operation and playing, time gap of, for example, five seconds from the start operation to the first beat is provided. User can choose of on/off of sounding of metronome. It is possible that some flags are attached as additional data to beats data during there is no other playing than solo parts, and sounding is activated during these flags are attached.

With the metronome of this invention, practice of music of moving tempo, which has been not possible with conventional metronome, is possible. The beat data can be carried by the data media. And so, students can be given the recorded tempo of teacher's play using this metronome, and use the recorded data for self study. Also, beats data can be made using this metronome, while the user listening to the model performance on the CD or other media.

No hard work of such as key in the massive numeric data is necessary for making the beats data of the metronome of this invention. It can be done by more intuitive and effective way, which is tapping. So it is possible to be made by wide range of users. On the other side, it is also possible to make initial data quickly using utility computer software.

It is possible to play precisely synchronized with moving tempo of playback with vertical move on the display of the metronome of this invention, because it is simulating the move of conductor's baton movement. Further two-dimensional display can provide more information to the users.

Practice using this metronome display only, that is, without sound is highly effective as preparation for playing under the baton of conductor.

BRIEF DESCRIPTION OF THE DRAWINGS

FIG. 2A corresponding to 4/4 meter, FIG. 2B corresponding to ⅝ meter, and FIG. 2C corresponding to subdivided ¾ meter;

DETAILED DESCRIPTION OF THE INVENTION

Two styles of embodiment of this invention are possible. With first embodiment, dedicated device with linear display device is used. The device has microprocessor in it, but user can operate as easy as home video deck, and cost is lower than a personal computer. It equips USB or other standard interface of personal computer, and mouse or foot switch with same interface as mouse. It also equips slot for memory media such as memory card, memory stick or others for storage and carrying purpose.

With second embodiment, the invention is realized as a application software of personal computer. Display, mouse, and audio output are generally equipped as standard. Further, it is easy to equipped with reader writer of memory media to exchange data with the metronome of dedicated device. Tablet personal computer, and handheld computer are suitable for use as the metronome, because they are all in one and fit in place for practice.

Figure 1:
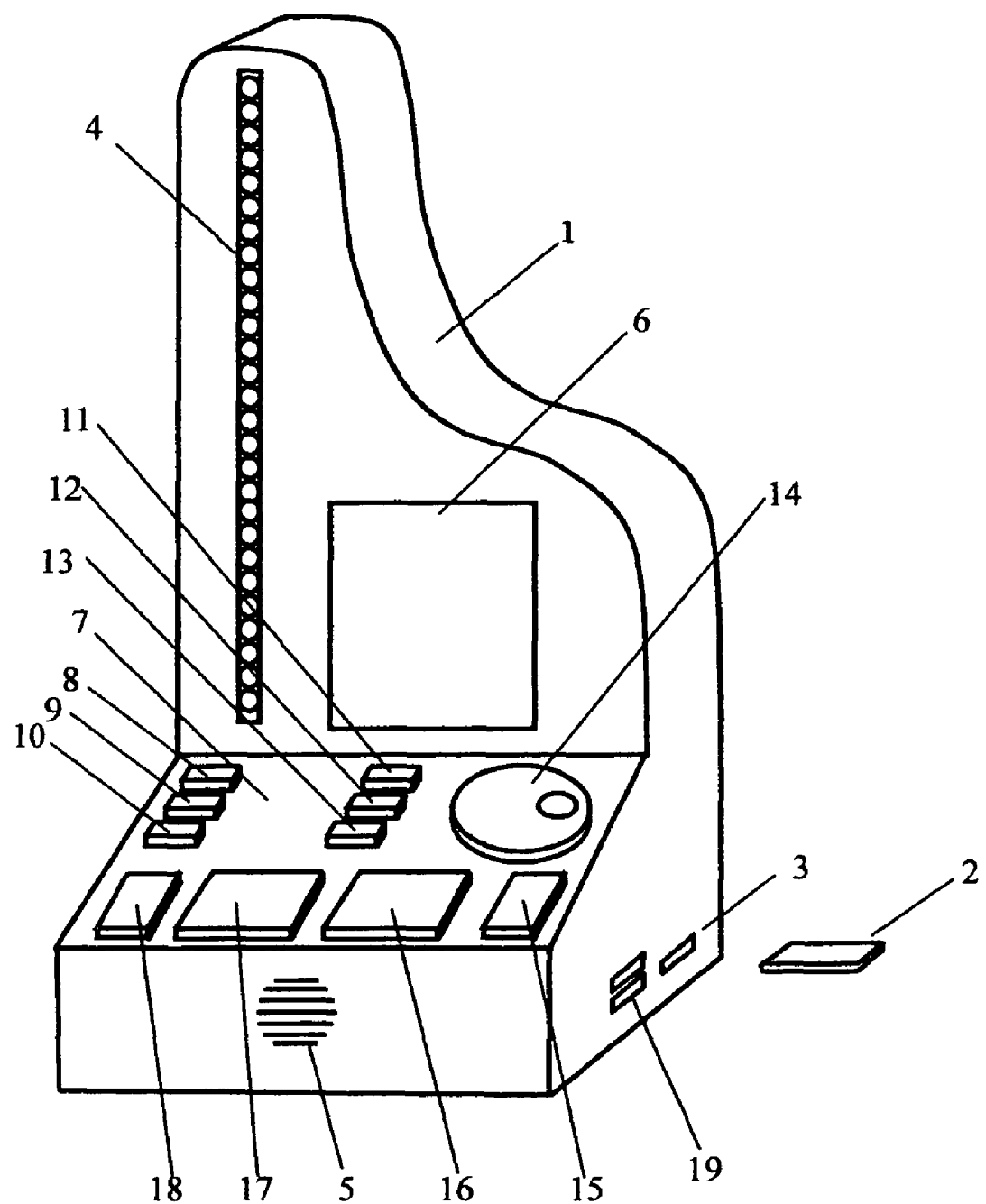
FIG. 1 is external appearance of an example of the apparatus of the first embodiment of this invention.

FIG. 1 shows external appearance of an example of the dedicated device of the first embodiment of this invention. Numeral 1 indicates body of the metronome, numeral 2 indicates memory media stores data of every beat duration and meter, and it can be put on and take off at a slot 3. Numeral 4 indicates linear array of light emitting elements, and element selected to emit move along the array, so that emitting point moves like conductor's baton. Its bottom is beat position. A speaker is under numeral 5 and sounds at each beat. Numeral 6 is a display panel, and it displays bar number, beat number and tempo during playback, also during setting options it displays necessary items.

Numeral 7 indicates operation panel. One panel is shown here and modifications are possible. Numeral 8 indicates power switch, 9 is on/off switch for speaker, 10 is on/off switch for write protection on beat data memory. These are latching type switches, which work as on in push fit position, and off in stand out position. Numeral 11 indicates menu button, which initiate menu selection operation. 12 is select button, and 13 is back button. These are momentary type, which does not stay in on position. Numeral 14 indicates rotary switch used for moving pointer up/down in the menu selection list. Numeral 15 indicates start/pause button, 16 is tapping button for beat input, 17 forced input button, 18 is stop/rewind button. These are momentary type button and robust against hard use. Panel face is better to be near horizontal, not vertical, for easy operation of buttons 15.about.18.

Numeral 19 indicates one or plural connectors of such as USB for mouse or foot switch having same interface with mouse about buttons. These are used for alternative input device to switches 16 and 17 operated at a little distant position. Connector for LAN, or antenna for wireless LAN is option and not shown in the figure.

Equipped inside are power battery, microprocessor, program ROM, RAM, interface for detachable memory media, USB interface, and LAN or other network interface. Audio circuit, display circuit, interface to operation panel are also equipped. Special and not common in general personal computer is driving circuit for emitting elements. System has a register each bit of which is corresponding to each emitting element. According to on/off of these bits, elements emit light. This register is writable from the microprocessor.

This apparatus has many optional selections, set by multilayer menu selection operation. When menu button 11 is pushed, menu at first level is displayed one item per line on the display device 6. Pointer on the display goes up or down with rotation of the rotary switch 14. Selection is taken when user puts the pointer on the desired item and pushes the selection button 12. Then menu goes into next level selection display or setting corresponding the selection is executed. Return button 13 is used for going back to menu on one level up.

Menu selection includes following items. At first, as mode of operation, initial input; playback from a file; conventional metronome, which means fixed tempo; record with fixed tempo; remote slave mode; file management; and so on. At second, selection of read out file, under this follows selection from internal memory; detachable memory media; and download through network; and further under this follows selection of folder or each file. At third, as selection of file to write, off, which means read only; overwrite; write on a new file; and follows selection of writing memory and file. At forth as selection of recording; selection of meter; number of beat in meter in one beat; and subdivide of beat. At fifth, as selection of playback, starting position; stop position; repeat on/off; sounding on/off, which follows selection of tone and volume; and number of dummy beat before start (0, 1, 1 bar, 2 bar, etc). At sixth, as selection of jump in music, repeat on/off of all or individual repeat; and cut specification. At seventh as miscellaneous setting, date and time adjusting; language selection; and so on. These look complicated compare with conventional metronome, but, as same as video camera, without entering details, basic operation can be conducted with default setting.

Operation of initial input is described hereunder. At first set meter related matter. For example, for fast 6/8 meter, tap only first and forth beats only. This is called "in two" in conducting. For this, set beat interval as 3 beat in meter. On the contrary, in case 2 taps for 1 beat in meter for slow 4/4 meter, set subdivide as 2. In case no setting about meter, it is dealt as 1 meter. Then push the start/pause button 15, and input each beat by tapping on the button 16. In case of change of meter setting, after tapping until the top of changing point, push the start/pause button 15, so system get in pause status. After change setting, push start/pause button 15 again, this timing is taken as top of changing point. Then continue tapping input. At last, push stop button 18.

Operation of recording with conventional metronome is described as follows. After setting of recording, it comes to tempo setting. Display. Adjust the starting tempo using rotary switch 14, and select it by selection button 12. With tapping on start button 15, fixed tempo metronome starts and records the beats. When changing tempo on the way, pause using start/pause button 15, change the tempo setting, and restart with one tap on start/pause button 15. Alternative method is without pause, choose new tempo with rotary switch and pushing selection button 12 to change tempo from next beat. Further more method is keeping push of selection button 12 and rotating the rotary switch to gradually change the tempo.

To above initial input operation, internal system reads the value of internal watch and records beat duration for each tap. It writes on the file set by the operation. No setting leads to writing on internal memory. Unit for time should be standardized for compatibility with other systems. Here temporarily is taken millisecond, that is, thousandth of one second. Time between start to the first beat is also recorded. For data discrimination, written are time of stop of recording and serial number of file.

Playback is conducted as follows. At first select the file. If no selection operation, the file used immediate before will be used. After initial input, recorded file is ready to playback. If preferred, select other setting. By pushing start/pause button 15 starts playback. Recorded time between start to first beat is reproduced. With start/pause button 15, pause on the way is possible, and one more push of start/pause button restarts playback of the rest part. Move of beat is displayed on the linear emitting elements. Sound comes from speaker 5, and this can manage on/off directly and any time with button 9.

On the display 6 shown are current bar number, beat number, meter, tempo, file number, etc. With pushing stop button 18, playback stops, but display remains. With one more push stop button 18, return to the starting position.

For paying regard to tempo in memory, players adapt their play to it, and do not input into the system. But, there is a means to adjust the system to play. This is done by input the timing of first beat of a bar of playing with button 16 or equivalent foot switch. System put this timing as the nearest first beat from playback point, and go forward from the beat following the recorded data.

Corresponding to the above playback operations, internal system works as follows. Read out beat duration data one by one from file which is selected or used immediate before in case no selection. The system sets the each duration data to timer, measures the length, and ticks the beat. It drives elements in linear emitting element array 4 in series up and down. The detail is described later. It updates contents of bar number and beat number on display 6. To adjust system to play, find the nearest first beat in bar in beat time data in the file. System set the input timing as found first beat time and continue playback from the beat. No change in data in the file.

Operation of correction on the recorded data is as follows. Changing the tempo for certain outskirts of the point corresponding to input timing, whish is called "macro tempo change", is done by one tapping at the first beat of bar in playing. Local beat wise changing of tempo, which is called "micro tempo change", is done by holding button 17 down and tapping on button 16 for each beat. Input the first tap as same timing with beat of playback, and thereafter tap freely. After the last tap before release of button 17, beat point is advanced as same number as tap input, and playback resumes to recorded tempo.

Corresponding to the above correction operations, internal system works as follows. Input from button 16 is distinguished as macro tempo change if button 17 is not pushed down, and as micro tempo change if button 17 is pushed down. For macro tempo change, find the nearest timing data from the first beat of bar from present time. In other word, decide which is nearer the first beat direct before the present time or the first beat direct after the present time. Calculate the ratio of duration time from the top of music or changed time of tempo signature until input from button 16, and duration time from the top of music or changed time of tempo signature until the time of found first beat of bar by playback. Replace all the duration time between the two point by multiplied value by the ratio. Also, replace the data in same way from found first beat of bar until end of music or changing point of tempo signature. For micro tempo change, find the nearest beat from the first tap timing, and replace duration time after that in memory to duration time of consecutive tapping input. After release of button 17, resume to data in memory and tick the beat.

Hereunder control of linear emitting element array is described. Moving pattern of emitting elements is designed as parabola in graph versus time axis. In other words, it should looks as a ball thrown upward goes up and down, and bound at the bottom. To differentiate strong beats and week beats, amplitude is set bigger before strong beat, and smaller before weak beat.

Figure 2:
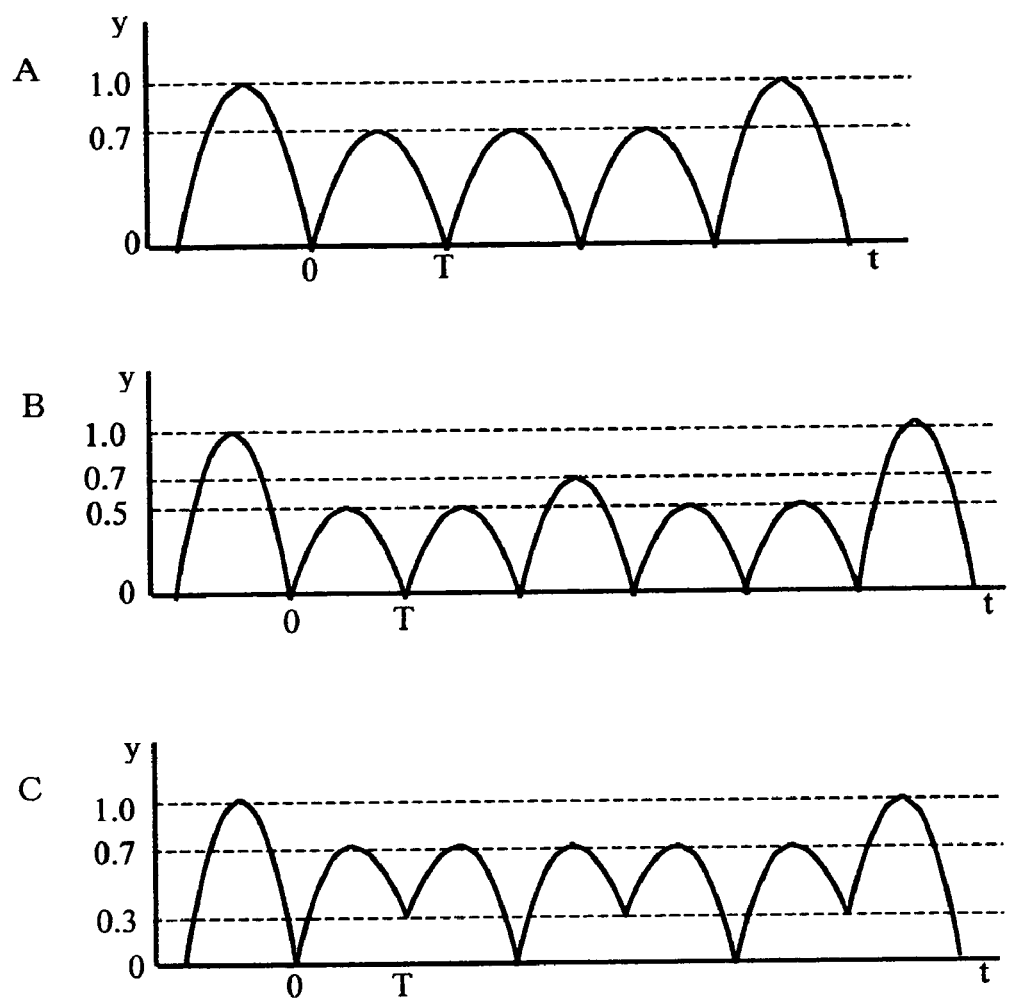
FIG. 2 is graphs showing move of the emitting point on the display device versus time.

FIG. 2 shows example of movement. In each graph, horizontal axis represents time, and vertical axis represents position of emitting point, which is normalized as maximum value is 1. FIG. 2A is example of 4/4 meter. One beat length dummy swing is with 100% amplitude, and returning point corresponds to first beat. Swing is of 70% amplitude before second, third and forth beats, and swing is 100% amplitude before next first beat. FIG. 2B shows example of 6/8 meter. Amplitudes are 100% before strong first beat, 70% before medium strong forth beat, and 50% before the rest weak beats. FIG. 2C is example of slow 3/4 meter. Each beat is subdivided in two, so one swing corresponds to eighth note. At dividing point called back beat, point does not return to bottom, but to 30% point, to distinguish with front beat. Top of swing is passed at the middle point in time scale. Then graph is not symmetry for upward and downward of swing.

Graph in FIG. 2 are shown as continuous function. But, system must calculate index of element to emit in the array device. Assume that beat duration of period is T, and time variable as t. Take millisecond as time unit. Time starts from 0 to simplify. Index of elements start 0 at the bottom, and assigned sequentially, until 31 in this embodiment, but not limited to. Calculation is executed repeatedly every 1 millisecond from time 0 to T. Assign x as t/T. Index of highest element of the swing assumed to be A. Then index number of emitting element Y is calculated with the formula;

$$4Ax(1-x).$$

Control circuit has 32 bits emitting elements driving register, which is written from the microprocessor. Switch on/off of electric current for emitting elements according to holding value of each bit of the register. Value of 1 corresponds to emitting of element. Microprocessor writes on the emitting elements driving register, so that only bit indexed as value calculated by above shown formula is 1. Further better method for showing smooth movement is to drive two elements, whose indexes sandwich Y, with intensity according to the fractional value of Y, in case the fractional value is not zero. In particular, the intensity is controlled by duration time of emitting. Accuracy is 1/8 by taking three fractional bits from calculation of Y For example, if the fractional part is 3/8, it works to emit element indexed integer part of Y with duration 5/8 milliseconds, and emit the next element with duration time of 3/8 milliseconds. In case fractional part is zero, emitting element indexed as integer part with duration time of 1 millisecond. In case metronome tempo is 120 for example, T is 500 milliseconds. So, repeating calculation 500 times and controlling emitting elements and duration time for every milliseconds are giving smooth enough up-down movement among 62 elements.

Element indexed 0 should have stronger emitting intensity, for example double, than other element. It may be realized by using other kind of elements, or by setting bigger electric current. Purpose to do this is to clear notice of beat timing, that is timing when emitting point reaches bottom. Also, to show bottom position all the time, keep the element indexed 0 emit certain level intensity. This is done by give some bias current only to the bottom element. In other design, additional emitting element is placed besides the bottom element and kept emitting. This element may emit in different color.

Figure 4:
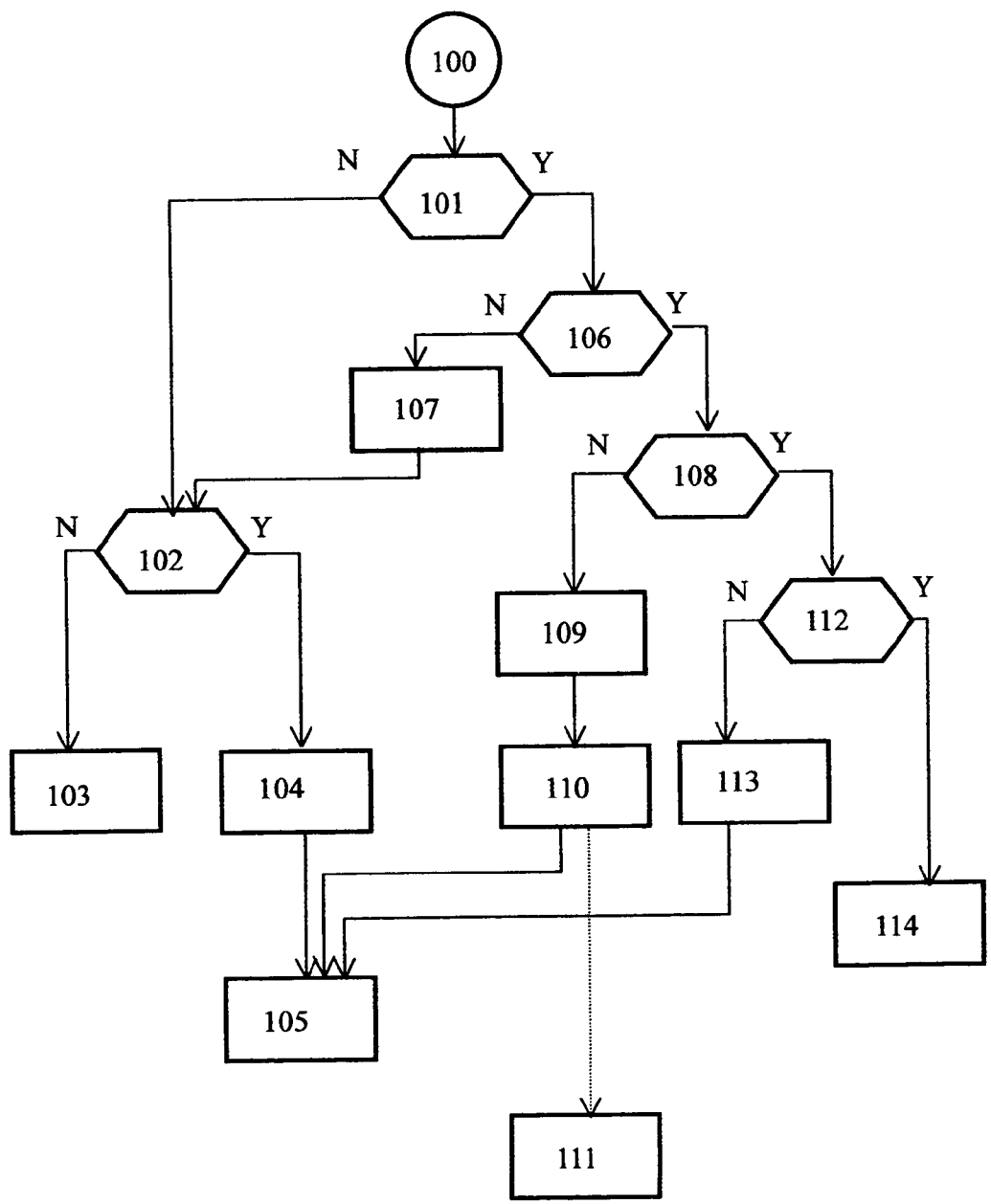
FIG. 4 shows flow diagram of essential part of computer program in the first embodiment of this invention.

FIG. 4 shows flowchart of program portion for above described playback and correction. In the figure, circle 100 shows starting point of process of timer interruption, which occurs every one millisecond. At box 101 decision is made about existence of any operation during the last period. If not, flow goes to the direction shown by N. At box 102, variable t is advanced by 1. And decision is made if it reaches T, that is beat length. If not, flow goes to direction of N. In box 103, value of Y is calculated based on t, and emitting elements driving register is written so that corresponding element emits. If t reaches T in box 102, flow goes to box 104. Here, real time of the timing is recorded connecting to the beat. Beat is advanced, and bar number is advanced when beat comes to predefined value. Next beat duration time T is read out from the file. In next box 105, t is set to 0, and emitting elements driving register is written so that bottom element is driven to emit.

If there exists event in box 101 decision, flow goes to box 106, and decision is made if it is pushing of button 16. If not, flow goes to box 107 and there process for other operation is executed. If it is pushing button 16, further decision if button 17 is pushed down is made. If not, it is macro tempo change. In box 109, nearest top of bar is detected, and number of beat and bar are replaced to detected value. Then in box 110, time of top of music or the latest tempo changing point is found, its difference with current real time is set as L2. On the other hand, its difference with real time of detected top of bar is set as L1. If the top of bar has not reached, scheduled time is calculated by adding up beat duration time. Modifying factor is the value L2 divided by L1. The first beat duration is modified by multiplied by the modifying factor. Here process in box 111, which has lower priority than other process is queued, and flow goes to box 105. In box 111, beat duration time from the top of bar to the next point of tempo changing are modified by multiplied by the modifying factor. Also, duration times from top of music or the latest tempo changing point to the top of bar are also modified by multiplied by the modifying factor.

If in box 108, decision is as button 17 pushed down, it is micro tempo change, and it goes to box 112. In box 112, decision is made if it is the first time after the button 17 is pushed down. If so, flow goes to 114. In box 114, nearest beat timing back or forward in playback is detected, and real time value is set as t1. If not the first time, flow goes to box 113. In box 113, duration time between current real time t2 and t1 is calculated and is over written on the duration time data. t1 is substituted by t2. beat number is advanced and next beat duration time T is read out from the file, then flow goes to 105.

Now, in above description for FIG. 4, it is convenient to let time of top of music as zero, and time unit be millisecond.

Hereunder second type of embodiment is described. In this type, the invention is realized by application software for personal computer. Compare with first dedicated device, user can easily set various selection with powerful graphic user interface. More important difference is that movement of conductor's baton can be almost completely simulated on two-dimensional graphic display with personal computer.

Tempo specification for many bars can be done in bulk. Specification of gradually changing tempo such as accelerando, stringendo, or ritardando are done at once with specify the beginning and finishing tempo and changing curve. Then, this can be used as workstation to make initial data because it can produce whole data for music work quickly. Data file can be given name of alphabetical character. So, the result can be written on detachable memory media and carried to the dedicated device of this invention.

Figure 3:
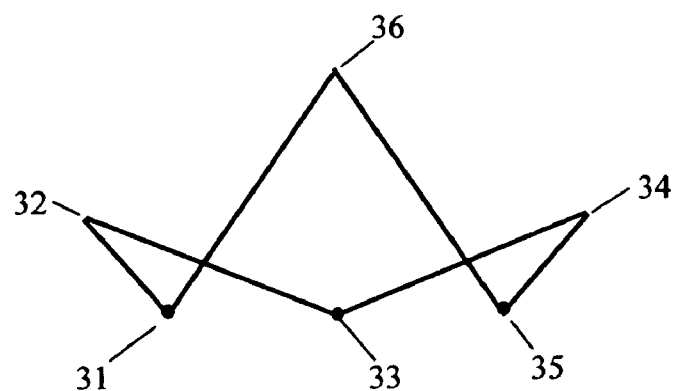
FIG. 3 shows moving point on the two-dimensional displays in the second embodiment of the invention.

It is possible for linear display device of first embodiment to give display easy to predict beat timing With two-dimensional display of second embodiment, further user can understand which beat in the bar it is now. As shown in the book "Text book of conducting", swing for 3 meter is typically as shown in FIG. 3. In FIG. 3, numeral 31 indicates first beat timing. Swing goes up with reducing speed, and then with accelerating speed goes to point 33, which is second beat position. Further with reducing speed goes to point 34, with accelerating speed to point 35, with reducing speed but big swing to point 36, with accelerating speed to point 31. Here distances along these lines can be used instead of A in the formula for Y The value of x is from 0 to 0.5 for reducing speed swing, and 0.5 to 1 for accelerating speed swing.

Display can be in the all-in-one type tablet PC, or separate type. To accommodate number of watching people, it can be a large format TV display, or projection type display for full orchestra or chorus. Also, plural displays can share the same video signal. So, it is possible to synchronize display in the different rooms. Small, less than 3 inch, display can be put on the corner of each music stand.

Device and software of this invention are used as replacement of conventional mechanical and electronic metronome. It will be used as tool for practice at musician's studio, orchestra, music school, and home. For music works, which contain moving tempo and can not be supported by conventional metronome, it works well. So, not only beginner but also skilled musicians will use it productively. It is useful for after recording of music playing sound of movie scenes, which should fit in the length of video. It is also useful for ballet, athletics, language learning, training of sequence of operation for firefighter, or military trainee.

Media memory, which stores model tempo for each music works, to use in this invention has value to deliver widely. So, its production and sales may be created. Music minus one and karaoke are used widely, but combined this with tempo data of this invention creates new level of artistic support for further wider users.

What is claimed is:

1. A method for indicating consecutive timing of beat of music with moving tempo, comprising:
   first step for inputting all consecutive beat durations and memorize values of the duration along a music composition or part of a music composition,
   second step for reading out consecutive beat durations memorized by first step, getting consecutive beat timings from the beat duration, and indicating the timings using visual, audio or other output,
   wherein second step has extension step of replacing memorized duration data with new duration data input by tapping operation, only while a second button other than used for said tapping operation is depressed.

2. A method for indicating consecutive timing of beat of music with moving tempo, comprising:
   first step for inputting all consecutive beat durations and memorize values of the duration along a music composition or part of a music composition,
   second step for reading out consecutive beat durations memorized by first step, getting consecutive beat timings from the beat duration, and indicating the timings using visual, audio or other output,
   wherein second step has extension step being activated when a button or same functional device is depressed during second step is running, and finding a nearest timing of first beat of bar from said button depressed timing, either already passed or will be reached later,
   said extension step replacing all duration data of beats corresponding to positions from starting point to ending point with each multiplied value by a ratio of time length spans from time of starting point until time of depression of the button against time length spans from time of starting point until time of said nearest first beat of bar, wherein said starting point is either top of music or tempo signature changing point, and ending point is either end of music or tempo signature changing point, and restarting the second step from said nearest first beat of bar.

* * * * *